(12) United States Patent
    Kono

(10) Patent No.: US 9,081,253 B2
(45) Date of Patent: Jul. 14, 2015

(54) INTEGRATED OPTICAL DEVICE AND OPTICAL MODULE

(71) Applicant: SUMITOMO ELECTRIC INDUSTRIES, LTD., Osaka-shi, Osaka (JP)

(72) Inventor: Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/075,086

(22) Filed: Nov. 8, 2013

(65) Prior Publication Data

US 2014/0133794 A1     May 15, 2014

(30) Foreign Application Priority Data

Nov. 9, 2012    (JP) ................................. 2012-247614

(51) Int. Cl.
     *G02F 1/035*      (2006.01)
     *G02F 1/225*      (2006.01)

(52) U.S. Cl.
     CPC ..................... *G02F 1/225* (2013.01)

(58) Field of Classification Search
     USPC ........................................................ 385/2, 3
     See application file for complete search history.

(56) References Cited

U.S. PATENT DOCUMENTS

| 2010/0014801 A1 | 1/2010 | Doi |
| 2010/0202723 A1* | 8/2010 | Sugiyama ........................ 385/2 |
| 2013/0202312 A1* | 8/2013 | Shen et al. ..................... 398/138 |

FOREIGN PATENT DOCUMENTS

| JP | 2010185978 | 8/2010 |
| WO | 2008117460 A1 | 2/2008 |

OTHER PUBLICATIONS

"Four-Channel Arrayed Poloarization Independent EA Modulator with an IPF Carrier Operating at 10 Gb/s" K. Tsuzuki, Y. Kawaguchi, S. Kondo, Y. Noguchi, N. Yoshimoto, H. Takeuchi, M. Hosoya, and M. Yanagibashi, IEEE Photonics Technology Letters, vol. 12, No. 3, Mar. 2000 pp. 281-283.

* cited by examiner

*Primary Examiner* — Jerry Blevins
(74) *Attorney, Agent, or Firm* — Smith, Gambrell & Russell LLP

(57) ABSTRACT

An integrated optical device includes first, second, third, and fourth edge portions; a plurality of modulators each of which includes an optical waveguide and an electrode portion provided on the optical waveguide, the optical waveguide extending in a direction of a first axis; a plurality of electric signal input sections arrayed along the first edge portion extending in a direction of a second axis intersecting with the first axis, each of the electric signal input sections being connected to one of the electrode portions of the modulators; an optical signal input section; and an optical signal output section provided in the second edge portion extending in the direction of the second axis. The modulators are arrayed in the direction of the second axis. In addition, the optical signal input section is provided in one of the second edge portion, the third edge portion, and the fourth edge portion.

14 Claims, 10 Drawing Sheets

INTEGRATED OPTICAL DEVICE AND OPTICAL MODULE

BACKGROUND OF THE INVENTION

1. Field of the Invention

The present invention relates to an integrated optical device and an optical module.

2. Description of the Related Art

Patent Literature 1 (International Publication No. WO2008/117460) describes a multilevel light intensity modulator including a plurality of Mach-Zehnder (MZ) modulators. In this Mach-Zehnder modulator, a transmission line propagating therethrough an electric signal is input to the corresponding modulator from a direction perpendicular to the extending direction of an optical waveguide. A transmission line for each of an input to the Mach-Zehnder modulator and an output from the Mach-Zehnder modulator is bent at an angle of 90 degrees. Patent Literature 2 (Japanese Unexamined Patent Application Publication No. 2010-185978) describes an integrated optical device including a plurality of Mach-Zehnder modulators. Non-Patent Literature 1 ("Four-Channel Arrayed Polarization Independent EA Modulator with an IPF Carrier Operating at 10 Gb/s" K. Tsuzuki, Y. Kawaguchi, S. Kondo, Y. Noguchi, N. Yoshimoto, H. Takeuchi, M. Hosoya, and M. Yanagibashi, IEEE PHOTONICS TECHNOLOGY LETTERS, VOL. 12, NO 3, MARCH 2000) describes an optical device in which four electro-absorption (EA) modulators are integrated. This EA modulator is mounted in a carrier used for supplying an electric signal. A transmission line for an electric signal is input to each EA modulator in a direction perpendicular to the optical waveguide of each EA modulator.

SUMMARY OF THE INVENTION

In an integrated optical device including a plurality of modulators, electric signals are individually supplied to individual modulators. It is important that the plural modulators are disposed so that, among the plural modulators, a difference between propagation paths for electric signals is made small and the propagation times of electric signals are made uniform. In the integration of the Mach-Zehnder modulators in Patent Literature 1 or the integration of the EA modulators in Non-Patent Literature 1, a configuration or a disposition has not been disclosed where wiring line lengths leading from signal pads to the optical modulators are made uniform between the integrated optical modulators.

An integrated optical device according to an aspect of the present invention includes (a) a first edge portion, a second edge portion located on an opposite side of the first edge portion, a third edge portion, and a fourth edge portion located on an opposite side of the third edge portion; (b) a plurality of modulators each of which includes an optical waveguide and an electrode portion provided on the optical waveguide, the optical waveguide extending in a direction of a first axis; (c) a plurality of electric signal input sections arrayed along the first edge portion extending in a direction of a second axis intersecting with the first axis, each of the electric signal input sections being connected to one of the electrode portions of the modulators; (d) an optical signal input section providing input light to the modulators; and (e) an optical signal output section provided in the second edge portion extending in the direction of the second axis, the optical signal output section being optically coupled to the modulators. The modulators are arrayed in the direction of the second axis. In addition, the optical signal input section is provided in one of the second edge portion, the third edge portion, and the fourth edge portion.

According to this integrated optical device, the plurality of electric signal input sections (for example, the first electric signal input section to the fourth electric signal input section) are arrayed along the first edge portion of the integrated optical device. The optical signal output section is provided in the second edge portion of the integrated optical device. Electric signals from the plurality of electric signal input sections (the first to fourth electric signal input sections) arrayed in the first edge portion drive the plurality of modulators (for example, the first modulator to the fourth modulator), arrayed in the direction of the second axis. In addition, the modulated optical signals in the modulators are guided to the optical signal output section provided in the second edge portion located on the opposite side of the first edge portion. Therefore, the positions of the output ports of the modulated optical signals may not interfere with the dispositions of the inputs of the driving signals for the modulators (the first modulator to the fourth modulator).

In addition, the plurality of electric signal input sections (the first electric signal input section to the fourth electric signal input section) are arrayed in the direction of the second axis. The plurality of modulators (the first modulator to the fourth modulator) are also arrayed in the direction of the second axis. Therefore, distances between the individual signal inputs and the modulators are substantially defined by a distance between the array of the plurality of electric signal input sections (the first electric signal input section to the fourth electric signal input section) and the array of the plurality of modulators (the first modulator to the fourth modulator). Among a plurality of wiring conductors connecting the plurality of electric signal input sections (the first electric signal input section to fourth electric signal input section) to the plurality of modulators (the first modulator to fourth modulator), respectively, a difference between the lengths thereof is reduced. Therefore, signal skews between the plurality of modulators (the first modulator to the fourth modulator) are also reduced.

The integrated optical device according to the aspect of the present invention may further include a waveguide type optical branching section provided between the second edge portion and the modulators. The optical signal output section may be optically coupled to the modulators through the waveguide type optical branching section. In addition, each of the modulators may include a Mach-Zehnder modulator.

According to this integrated optical device, the waveguide type optical branching section provided between the second edge portion and the modulators may not interfere with the dispositions of input conductors used for supplying the electric signals to the modulators. In addition, since the position of the optical signal input section (the input port of an optical signal) is provided in an edge portion different from the first edge portion of the integrated optical device, the dispositions of the output ports of modulated optical signals from the modulators may not be interfered with.

The integrated optical device according to the aspect of the present invention may further include a plurality of conductive portions for connecting a termination device, each of the conductive portions being connected to one of the electrode portions of the modulators; and an optical branching device to branch light to the modulators, the optical branching device optically coupling the optical signal input section to the modulators. The integrated optical device includes a first portion, a second portion, and a third portion which are arrayed in order along the first axis in a direction from the second edge portion toward the first edge portion. The plurality of conductive portions are provided in the first portion in the integrated optical device. The plurality of modulators are provided in the second portion in the integrated optical device. The optical branching device is provided in the third portion in the integrated optical device.

According to this integrated optical device, the optical branching device branching light from the optical signal input section to the modulators is provided in the third portion. The modulators are provided in the second portion. The conductive portions for connecting a termination device are provided in the first portion. The first portion, the second portion, and the third portion of the integrated optical device are arrayed in order along the first axis in a direction from the second edge portion toward the first edge portion. The optical branching device is provided between the modulators and the first edge portion. Between the modulators and the second edge portion, the first portion is provided in which the conductive portions for connecting a termination device are disposed. Therefore, without being interfered with by the dispositions of the optical branching device, the modulators, and the conductive portions, distances between the individual electric signal inputs and the modulators may be defined owing to a distance between the array of the electric signal input sections and the array of the modulators.

The integrated optical device according to the aspect of the present invention may further include a plurality of conductive portions for connecting a termination device, each of the conductive portions being connected to one of the electrode portions of the modulators; and an optical branching device to branch light to the modulators, the optical branching device optically coupling the optical signal input section and the modulators. The integrated optical device includes a first portion and a second portion which are arrayed in the direction of the first axis. The plurality of conductive portions are provided in the first portion in the integrated optical device. The plurality of modulators are provided in a first region in the second portion in the integrated optical device. The optical branching device is provided in a second region in the second portion in the integrated optical device. In addition, the first region and the second region in the second portion are arrayed in the direction of the second axis.

According to this integrated optical device, the conductive portions used for connecting a termination device are provided in the first portion. The modulators are provided in the first region within the second portion. The first portion and the second portion are arrayed in order in the direction of the first axis. The optical branching device branching light to the modulators is provided in the second region within the second portion. Between the modulators and the second edge portion, the first portion is provided in which the conductive portions for connecting a termination device are disposed. Therefore, without being interfered with by the dispositions of the optical branching device, the modulators, and the conductive portions, distances between the individual electric signal inputs and the modulators may be defined owing to a distance between the array of the electric signal input sections and the array of the modulators.

In addition, the optical branching device and the modulators are arrayed in the direction of the second axis with avoiding an area between the modulators and the first edge portion. Therefore, independently from the disposition of the optical branching device, it is possible to define a distance between the modulators and the first edge portion.

In the integrated optical device according to the aspect of the present invention, the optical signal input section is preferably provided in the third edge portion extending in the direction of the first axis. Alternatively, in the integrated optical device according to the aspect of the present invention, the optical signal input section is preferably provided in the second edge portion extending in the direction of the second axis.

In an integrated optical device according to the aspect of the present invention, the plurality of modulators may include a first modulator, a second modulator, a third modulator, and a fourth modulator. The plurality of electric signal input sections may include a first electric signal input section, a second electric signal input section, a third electric signal input section, and a fourth electric signal input section that are connected to the first modulator, the second modulator, the third modulator, and the fourth modulator, respectively. The first modulator, the second modulator, the third modulator, and the fourth modulator are preferably arrayed in order in the direction of the second axis. The first electric signal input section, the second electric signal input section, the third electric signal input section, and the fourth electric signal input section are preferably arrayed along the first edge portion extending in the direction of the second axis. In addition, the optical signal input section is preferably provided in the third edge portion extending in the direction of the first axis.

In an integrated optical device according to the aspect of the present invention, the optical signal output section may include a plurality of optical output ports which are arrayed along the second edge portion. The optical signal input section may be provided in the third edge portion, the optical signal input section including a plurality of optical input ports which are arrayed along the third edge portion. In addition, each of the modulators may include an electro-absorption modulator and be optically coupled to one of the optical input ports and one of the optical output ports.

According to this integrated optical device, the individual modulators individually receive lights from the individual optical input ports within the optical signal input section provided in the third edge portion of the integrated optical device. In addition, the individual modulators are optically coupled to the individual optical output ports arrayed along the second edge portion. This disposition may be suitable for the dispositions of electro-absorption (EA) semiconductor modulators.

The integrated optical device according to the aspect of the present invention may further include a plurality of conductive portions for connecting a termination device, each of the conductive portions being connected to one of the electrode portions of the modulators. The conductive portions may be arrayed along the third edge portion or the fourth edge portion.

According to this integrated optical device, the conductive portions used for connecting a termination device are arrayed along the third edge portion or the fourth edge portion. The dispositions of the conductive portions used for connecting a termination device may not interfere with the disposition of the input of an electric signal and the disposition of the output of an optical signal.

An optical module according to the aspect of the present invention includes (a) one of the above-mentioned integrated optical devices; (b) a plurality of conductive bodies; (c) a driving element supplying a driving signal from the plurality of conductive bodies to the electric signal input sections in the integrated optical device; (d) an input optical waveguide optically coupled to the optical signal input section in the integrated optical device; (e) an output optical waveguide optically coupled to the optical signal output section in the integrated optical device; and (f) a housing supporting the integrated optical device, the driving element, the input optical waveguide, and the output optical waveguide. The housing includes a first sidewall and a second sidewall located on an opposite side of the first sidewall, the first sidewall and the second sidewall extending in the direction of the second axis. The input optical waveguide and the output optical waveguide are connected to the first sidewall of the housing. In addition, the plurality of conductive bodies connected to the driving element are provided in the second sidewall of the housing.

According to this optical module, the output optical waveguide and the input optical waveguide are connected to the first sidewall of the housing. In addition, the first sidewall supports the output optical waveguide and the input optical waveguide. In addition, the plurality of conductive bodies connected to the driving element are provided in the second sidewall of the housing. Therefore, the dispositions of the input and the output of an optical signal may not interfere with the disposition of the input of an electric signal. In addition, through the driving element receiving electric signals from the conductive bodies in the second sidewall, the driving signals are supplied to the electric signal input sections in the integrated optical device. Since the driving element is located between the second sidewall and the integrated optical device, it is possible to reduce a skew between signals in the flows of the electric signals from the array of the conductive bodies in the second sidewall of the housing to the integrated optical device.

The optical module according to the aspect of the present invention may further include a first optical circuit multiplexing light from the optical signal output section in the integrated optical device and providing multiplexed light to the output optical waveguide; and a second optical circuit providing light from the input optical waveguide to the optical signal input section in the integrated optical device. The housing may include a supporting surface including a first area, a second area, and a third area that are arrayed in the direction of the first axis. The second area may include a fourth area and a fifth area, arrayed in the direction of the second axis. The first area of the supporting surface may mount therein the driving element. The third area of the supporting surface may mount therein the first optical circuit. The fourth area of the supporting surface may mount therein the integrated optical device. The fifth area of the supporting surface may mount therein the second optical circuit.

According to this optical module, the integrated optical device, the driving element, the first optical circuit, and the second optical circuit may be disposed with being associated with the dispositions of the electric signal input sections, the optical signal output section, and the optical signal input section in the integrated optical device.

The optical module according to the aspect of the present invention may further include a first optical circuit multiplexing light from the optical signal output section in the integrated optical device and providing multiplexed light to the output optical waveguide; and a second optical circuit providing light from the input optical waveguide to the optical signal input section in the integrated optical device. The housing includes a supporting surface including a first area, a second area, and a third area that are arrayed in the direction of the first axis. The first area of the supporting surface may mount therein the driving element. The second area of the supporting surface may mount therein the integrated optical device. The third area of the supporting surface may mount therein the first optical circuit and the second optical circuit.

DESCRIPTION OF THE PREFERRED EMBODIMENTS

By taking into account the following detailed description with reference to accompanying drawings illustrated as exemplification, a knowledge of the present invention is easily understood. Subsequently, an embodiment according to an integrated optical device and an optical module of the present invention will be described with reference to accompanying drawings. If possible, the same symbol will be assigned to the same portion.

Figure 1:
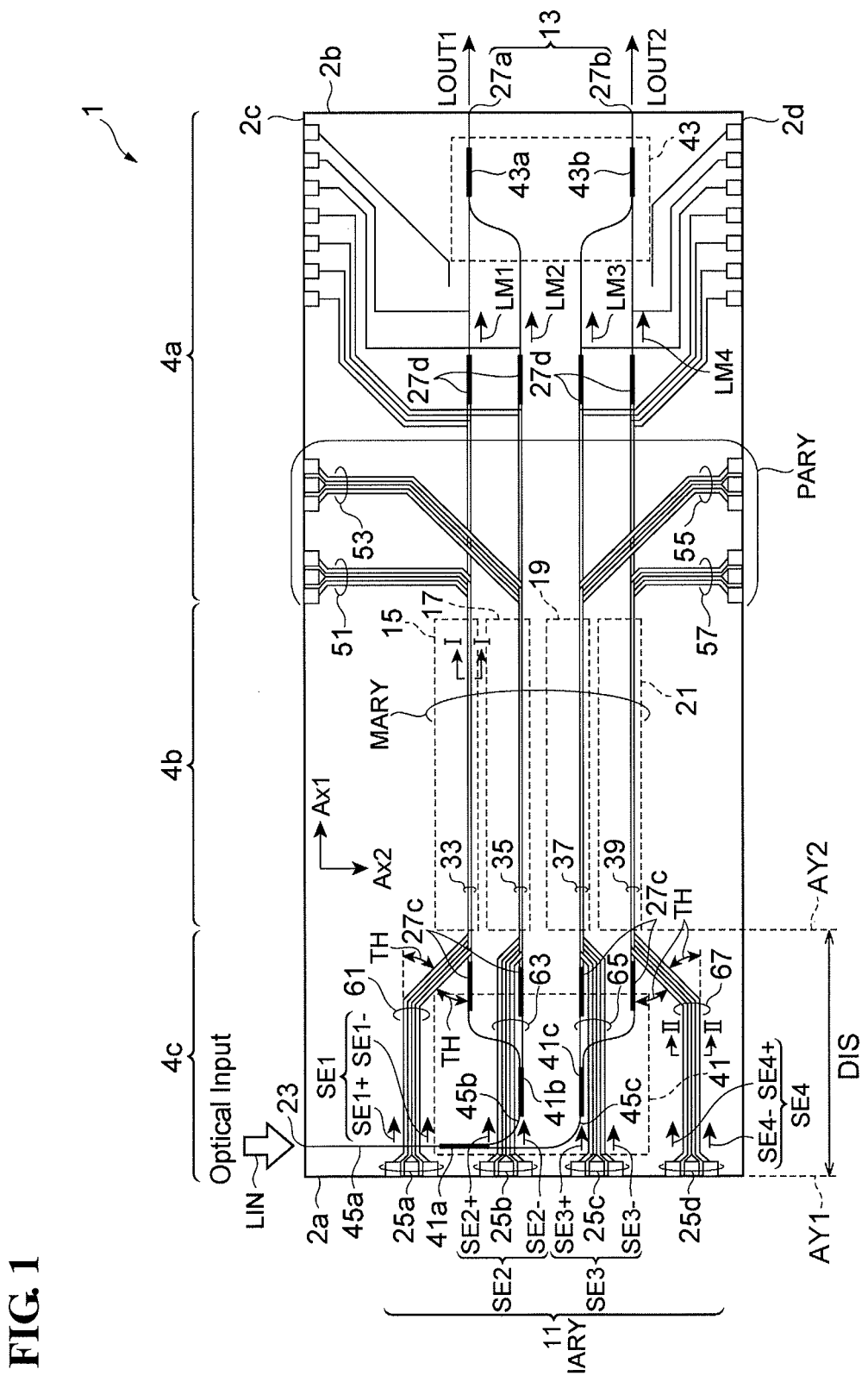
FIG. 1 is a drawing illustrating an integrated optical device according to the present embodiment.

FIG. 1 is a drawing illustrating an integrated optical device according to the present embodiment. An integrated optical device 1 includes an electric signal input section 11, an optical signal output section 13, a first modulator 15, a second modulator 17, a third modulator 19, a fourth modulator 21, and an optical signal input section 23. The integrated optical device 1 has a first edge portion 2a and a second edge portion 2b, and the first edge portion 2a is located on the opposite side of the second edge portion 2b. In addition, the integrated optical device 1 has a third edge portion 2c and a fourth edge portion 2d, and the third edge portion 2c is located on the opposite side of the fourth edge portion 2d. The third edge portion 2c and the fourth edge portion 2d extend in the direction of a first axis Ax1. The first edge portion 2a and the second edge portion 2b extend in the direction of a second axis Ax2. The second axis Ax2 extends in a direction intersecting with the first axis Ax1, and this intersection forms, for example, a right angle therewith. The electric signal input section 11 includes a first electric signal input section 25a, a second electric signal input section 25b, a third electric signal input section 25c, and a fourth electric signal input section 25d. The first electric signal input section 25a, the second electric signal input section 25b, the third electric signal input section 25c, and the fourth electric signal input section 25d are arrayed along the first edge portion 2a of the integrated optical device 1. The optical signal output section 13 is provided in the second edge portion 2b of the integrated optical device 1. In an embodiment, the optical signal output section 13 includes, for example, a first optical signal output section 27a and a second optical signal output section 27b, and the first optical signal output section 27a and the second optical signal output section 27b are arrayed along the second edge portion 2b of the integrated optical device 1.

The optical signal input section 23 receives an input light LIN from the outside, and provide the input light LIN to the first modulator 15, the second modulator 17, the third modulator 19, and the fourth modulator 21. The first modulator 15, the second modulator 17, the third modulator 19, and the fourth modulator 21 are optically coupled to the optical signal output section 13. The optical signal output section 13 receives modulated optical signals LM1, LM2, LM3, and LM4 from the first modulator 15, the second modulator 17, the third modulator 19, and the fourth modulator 21, respectively.

The first modulator 15 includes a first electrode portion 33 receiving a first electric signal SE1 from the first electric signal input section 25a. The second modulator 17 includes a second electrode portion 35 receiving a second electric signal SE2 from the second electric signal input section 25b. The third modulator 19 includes a third electrode portion 37 receiving a third electric signal SE3 from the third electric signal input section 25c. The fourth modulator 21 includes a fourth electrode portion 39 receiving a fourth electric signal SE4 from the fourth electric signal input section 25d. The first modulator 15, the second modulator 17, the third modulator 19, and the fourth modulator 21 are arrayed in order in the direction of the second axis Ax2.

According to this integrated optical device 1, the first electric signal input section 25a, the second electric signal input section 25b, the third electric signal input section 25c, and the fourth electric signal input section 25d are arrayed along the first edge portion 2a of the corresponding integrated optical device 1. Furthermore, the optical signal output section 13 is provided in the second edge portion 2b of the corresponding integrated optical device 1. The electric signals SE1 to SE4 from the first to fourth electric signal input sections 25a to 25d arrayed in the first edge portion 2a drive the first modulator to fourth modulators 15, 17, 19, and 21 arrayed in order in the direction of the second axis Ax2. Furthermore, the modulated optical signals LM1, LM2, LM3, and LM4 from the first modulator to fourth modulator 15, 17, 19, and 21 propagate to the optical signal output section 13 provided in the second edge portion 2b located on the opposite side of the first edge portion 2a. Therefore, the position of the output port (13) for the modulated optical signals LM1, LM2, LM3, and LM4 does not interfere with the disposition of the electric input 11 (the first electric signal input section to fourth electric signal input section 25a to 25d) for the driving signals SE1 to SE4 used for the first modulator to fourth modulator 15, 17, 19, and 21.

In addition, the first electric signal input section to fourth electric signal input section 25a to 25d are arrayed in the direction of the second axis Ax2. Furthermore, the first modulator to fourth modulator 15, 17, 19, and 21 are also arrayed in the direction of the second axis Ax2. Therefore, distances between the individual signal inputs SE1 to SE4 and the optical modulators 15, 17, 19, and 21 are roughly specified by a distance between the array (array axis AY1) of the first electric signal input section to fourth electric signal input section 25a to 25d and the array (array axis AY2) of the first modulator to fourth modulator 15, 17, 19, and 21. Among a plurality of wiring conductors connecting the first electric signal input section to fourth electric signal input section 25a to 25d to the first modulator to fourth modulator 15, 17, 19, and 21, respectively, this modulator array MARY makes the occurrence of a difference between the lengths thereof difficult. Therefore, signal skews between the first modulator to fourth modulator 15, 17, 19, and 21 are reduced.

In the embodiment, the integrated optical device 1 includes the four modulators of the first modulator 15, the second modulator 17, the third modulator 19, and the fourth modulator 21. The integrated optical device 1 also includes the first electric signal input section to fourth electric signal input section 25a to 25d. However, the integrated optical device may include a plurality of modulators. Accordingly; the integrated optical device may include a plurality of electric signal input sections arrayed along the first edge portion extending in a direction of a second axis.

First Embodiment

Figure 2:
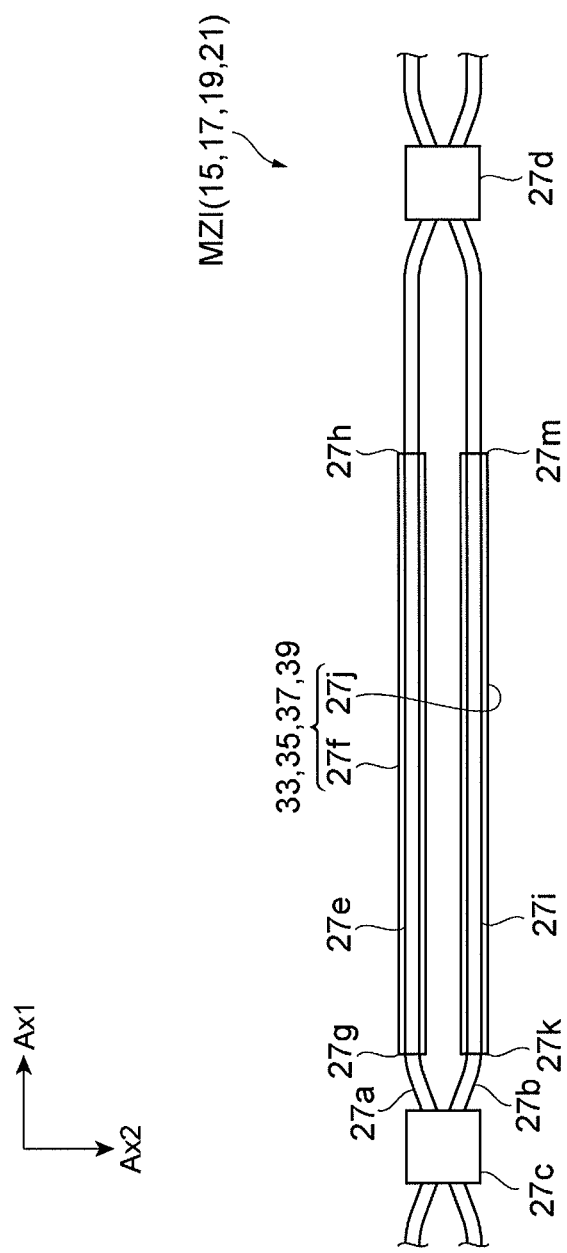
FIG. 2 is a drawing illustrating an example of a Mach-Zehnder modulator.

Each of the first modulator 15, the second modulator 17, the third modulator 19, and the fourth modulator 21 includes a Mach-Zehnder modulator. FIG. 2 is a drawing illustrating an example of a Mach-Zehnder modulator. A Mach-Zehnder modulator MZI configuring each of the first modulator 15, the second modulator 17, the third modulator 19, and the fourth modulator 21 includes a first waveguide arm 27a, a second waveguide arm 27b, a first demultiplexer 27c optically coupled to the first waveguide arm 27a and the second waveguide arm 27b, and a first multiplexer 27d optically coupled to the first waveguide arm 27a and the second waveguide arm 27b. For example, multi-mode interference (MMI) couplers, directional couplers, Y-branch couplers, or the like may be used for the first demultiplexer 27c and the first multiplexer 27d. The first waveguide arm 27a includes an optical waveguide 27e that is used for modulation and extends in the direction of the first axis Ax1. In addition, on the optical waveguide 27e, an electrode 27f that receives a driving signal for modulation is provided. The electrode 27f extends in the direction of the first axis Ax1 along the optical waveguide 27e. The electrode 27f includes one end 27g and the other end 27h. The one end 27g of the electrode 27f is connected to a conductive line receiving an electric signal from the electric input 11. In addition, the other end 27h of the electrode 27f is connected to a conductive line to be connected to a termination device. The second waveguide arm 27b includes an optical waveguide 27i that is used for modulation and extends in the direction of the first axis Ax1. On the optical waveguide 27i, an electrode 27j that receives a driving signal for modulation is provided. The electrode 27j extends in the direction of the first axis Ax1 along the optical waveguide 27i. The electrode 27j includes one end 27k and the other end 27m. The one end 27k of the electrode 27j is connected to a conductive line receiving an electric signal from the electric input 11. In addition, the other end 27m of the electrode 27j is connected to a conductive line to be connected to a termination device. In an embodiment, the length (a distance between the one end 27g and the other end 27h) of the electrode 27f is equal to the length (a distance between the one end 27k and the other end 27m) of the electrode 27j. In addition, in the direction of the axis Ax1, the positions of the one end 27g and the one end 27k are aligned.

In more detail, the first electrode portion 33 receiving the first electric signal SE1 includes the modulator electrode 27f of the first waveguide arm 27a and the modulator electrode 27j of the second waveguide arm 27b in the Mach-Zehnder modulator in the first modulator 15. In addition, the first electric signal SE1 includes differential signals SE1+ and SE1− to be supplied to the modulator electrode 27f and the modulator electrode 27j of the Mach-Zehnder modulator in the first modulator 15. The second electrode portion 35 receiving the second electric signal SE2 includes the modulator electrode 27f of the first waveguide arm 27a and the modulator electrode 27j of the second waveguide arm 27b in the Mach-Zehnder modulator in the second modulator 17. In addition, the second electric signal SE2 includes differential signals SE2+ and SE2− to be supplied to the modulator electrode 27f and the modulator electrode 27j of the Mach-Zehnder modulator in the second modulator 17. The third electrode portion 37 receiving the third electric signal SE3 includes the modulator electrode 27f of the first waveguide arm 27a and the modulator electrode 27j of the second waveguide arm 27b in the Mach-Zehnder modulator in the third modulator 19. In addition, the third electric signal SE3 includes differential signals SE3+ and SE3− to be supplied to the modulator electrode 27f and the modulator electrode 27j of the Mach-Zehnder modulator in the third modulator 19. The fourth electrode portion 39 receiving the fourth electric signal SE4 includes the modulator electrode 27f of the first waveguide arm 27a and the modulator electrode 27j of the second waveguide arm 27b in the Mach-Zehnder modulator in the fourth modulator 21. In addition, the fourth electric signal SE4 includes differential signals SE4+ and SE4− to be supplied to the modulator electrode 27f and the modulator electrode 27j of the Mach-Zehnder modulator in the fourth modulator 21.

As will be appreciated from the above description, each of the first modulator 15, the second modulator 17, the third modulator 19, and the fourth modulator 21 includes the optical waveguide 27e and the optical waveguide 27i, used for modulation. The optical waveguides 27e and 27i extend in the direction of the first axis Ax1. In addition, the electrode 27f and the electrode 27j also extend in the direction of the first axis Ax1. In the array MARY including the first modulator 15, the second modulator 17, the third modulator 19, and the fourth modulator 21, the electrode 27f and the electrode 27j are arrayed in the direction of the second axis Ax2. In addition, the optical waveguides 27e and 27i are also arrayed in the direction of the second axis Ax2.

The integrated optical device 1 includes a waveguide type optical branching section 41 and a waveguide type optical branching (coupling) section 43. The waveguide type optical branching section 41 is provided between the first edge portion 2a and the array MARY including the first modulator to fourth modulator 15, 17, 19, and 21. The waveguide type optical branching section 43 is provided between the second edge portion 2b and the array MARY including the first modulator to fourth modulator 15, 17, 19, and 21. The optical signal input section 23 may be provided in one of the second edge portion 2b, the third edge portion 2c, and the fourth edge portion 2d of the integrated optical device 1. The optical signal input section 23 is provided in the third edge portion 2c, in FIG. 1.

According to this integrated optical device 1, the optical signal input section 23 is provided in an edge portion different from the first edge portion 2a of the integrated optical device 1. The input optical signal LIN is coupled to the input port (optical signal input section) 23. Accordingly, the position of the input port in the optical signal input section 23 does not interfere with the dispositions of input conductors used for supplying the electric signals SE1 to SE4 to the first modulator to fourth modulator 15, 17, 19, and 21. The first modulator to fourth modulator 15, 17, 19, and 21 provide the modulated optical signals LM1 to LM4 to the output port 13 through the waveguide type optical branching section 43. The waveguide type optical branching section 43 is provided between the second edge portion 2b and the array MARY including the first modulator to fourth modulator 15, 17, 19, and 21. Accordingly, the propagation paths of the modulated optical signals LM1 to LM4 and the disposition of the output port 13 do not interfere with the disposition of the input port 23 to which the input optical signal LIN is coupled. The waveguide type optical branching section 43 includes a first multiplexer 43a and a second multiplexer 43b. The first multiplexer 43a multiplexes the modulated optical signals LM1 and LM2 from the first modulator 15 and the second modulator 17, and generates and provides a multiplexed signal light LOUT1 to the output port 27a. The second multiplexer 43b multiplexes the modulated optical signals LM3 and LM4 from the third modulator 19 and the fourth modulator 21, and generates and provides a multiplexed signal light LOUT2 to the output port 27b.

The integrated optical device 1 includes a first conductive portion 51, a second conductive portion 53, a third conductive portion 55, and a fourth conductive portion 57.

The first conductive portion 51 is connected to the other end of the first electrode portion 33 in the first modulator 15, and connects the other end of the first electrode portion 33 to a termination device. The second conductive portion 53 is connected to the other end of the second electrode portion 35 in the second modulator 17, and connects the other end of the second electrode portion 35 to a termination device. The third conductive portion 55 is connected to the other end of the third electrode portion 37 in the third modulator 19, and connects the other end of the third electrode portion 37 to a termination device. The fourth conductive portion 57 is connected to the other end of the fourth electrode portion 39 in the fourth modulator 21, and connects the other end of the fourth electrode portion 39 to a termination device. The termination device includes a passive element (for example, a resistor) connected so as to reduce electrical reflection occurring in the physical end of a conductive body.

The integrated optical device 1 further includes an optical branching device (the waveguide type optical branching section 41). The optical branching device (the waveguide type optical branching section 41) branches light to the array MARY including the first modulator 15, the second modulator 17, the third modulator 19, and the fourth modulator 21.

In the present embodiment, the optical branching device (the waveguide type optical branching section 41) includes a first optical demultiplexer 41a, a second optical demultiplexer 41b, and a third optical demultiplexer 41c. The first optical demultiplexer 41a is connected to an optical waveguide 45a guiding the light LIN from the input port 23, and receives the light LIN from the optical waveguide 45a. One path of the first optical demultiplexer 41a is optically coupled to the second optical demultiplexer 41b through the optical waveguide 45b. The second optical demultiplexer 41b is optically coupled to the first modulator 15 and the second modulator 17, and branches light to the first modulator 15 and the second modulator 17. In addition, the other path of the first optical demultiplexer 41a is optically coupled to the third optical demultiplexer 41c through the optical waveguide 45c. The third optical demultiplexer 41c is optically coupled to the third modulator 19 and the fourth modulator 21, and branches light to the third modulator 19 and the fourth modulator 21.

The integrated optical device 1 includes a first portion 4a, a second portion 4b, and a third portion 4c, arrayed in that order in a direction from the second edge portion 2b toward the first edge portion 2a along the first axis Ax1. The first conductive portion 51, the second conductive portion 53, the third conductive portion 55, and the fourth conductive portion 57 are provided in the first portion 4a in the integrated optical device 1. The array MARY including the first modulator 15, the second modulator 17, the third modulator 19, and the fourth modulator 21 is provided in the second portion 4b in the integrated optical device 1. The optical branching device (the waveguide type optical branching section 41) is provided in the third portion 4c in the integrated optical device 1.

According to this integrated optical device 1, the optical branching device (the waveguide type optical branching section 41) branching light to the first modulator 15, the second modulator 17, the third modulator 19, and the fourth modulator 21 is provided in the third portion 4c. The array MARY of modulators is provided in the second portion 4b. An array PARY including the conductive portions 51, 53, 55, and 57 connected to a termination device is provided in the first portion 4a. The optical branching device 41 is provided between the array MARY of modulators and the first edge portion 2a. The array PARY of conductive portions is provided between the array MARY of modulators and the second edge portion 2b. In the embodiment, the optical branching device 41, the array MARY of modulators, and the array PARY of conductive portions are disposed in that order in a direction of the first axis Ax1. Therefore, distances between each individual signal input 11 and optical modulators 15, 17, 19, and 21 are substantially defined by a distance DIS between an array IARY including the first electric signal input section 25a to the fourth electric signal input section 25d and the modulator array MARY.

One end of the first conductive portion 51 is connected to the first electrode portion 33 in the first modulator 15. Furthermore, the other end of the first conductive portion 51 is connected to a conductive pad located in the third edge portion 2c, and a termination device is connected to this conductive pad connected to the first conductive portion 51. One end of the second conductive portion 53 is connected to the second electrode portion 35 in the second modulator 17. Furthermore, the other end of the second conductive portion 53 is connected to a conductive pad located in the third edge portion 2c, and a termination device is connected to this conductive pad connected to the second conductive portion 53. One end of the third conductive portion 55 is connected to the third electrode portion 37 in the third modulator 19. Furthermore, the other end of the third conductive portion 55 is connected to a conductive pad located in the fourth edge portion 2d, and a termination device is connected to this conductive pad connected to the third conductive portion 55. One end of the fourth conductive portion 57 is connected to the fourth electrode portion 39 in the fourth modulator 21. Furthermore, the other end of the fourth conductive portion 57 is connected to a conductive pad located in the fourth edge portion 2d, and a termination device is connected to this conductive pad connected to the fourth conductive portion 57.

One end of the electrode 33 of the Mach-Zehnder modulator in the first modulator 15 is connected to the first electric signal input section 25a located in the first edge portion 2a of the integrated optical device 1 through a wiring conductor 61. One end of the electrode 35 of the Mach-Zehnder modulator in the second modulator 17 is connected to the second electric signal input section 25b located in the first edge portion 2a of the integrated optical device 1 through a wiring conductor 63. One end of the electrode 37 of the Mach-Zehnder modulator in the third modulator 19 is connected to the third electric signal input section 25c located in the first edge portion 2a of the integrated optical device 1 through a wiring conductor 65. One end of the electrode 39 of the Mach-Zehnder modulator in the fourth modulator 21 is connected to the fourth electric signal input section 25d located in the first edge portion 2a of the integrated optical device 1 through a wiring conductor 67. The wiring conductor 61 is bent twice at an angle TH with respect to the straight-line portion thereof. The wiring conductor 63 is bent twice at an angle TH with respect to the straight-line portion thereof. The wiring conductor 65 is bent twice at an angle TH with respect to the straight-line portion thereof. The wiring conductor 67 is bent twice at an angle TH with respect to the straight-line portion thereof. According to the present embodiment, in the wiring conductors 61, 63, 65, and 67, the bending angles thereof is set to similar values. The range of the angle TH is smaller than 90 degrees. Preferably, the range of the angle TH is less than or equal to 45 degrees. In addition, the wiring conductors 61, 63, 65, and 67 preferably have a length of less than or equal to 3 mm. A difference between the lengths of the wiring conductors 61, 63, 65, and 67 is preferably less than or equal to 0.5 mm.

Second Embodiment

Figure 3:
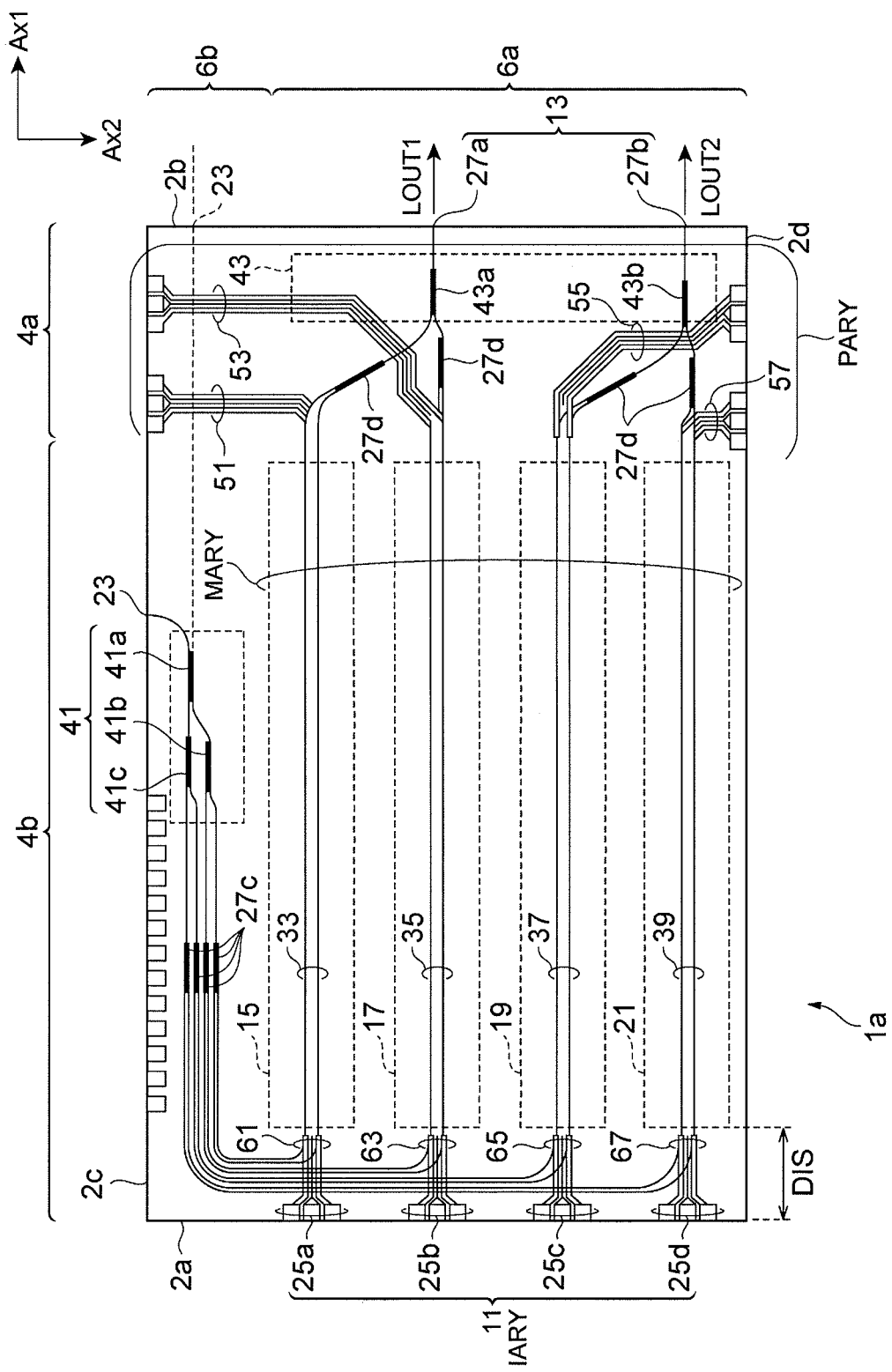
FIG. 3 is a drawing illustrating an integrated optical device according to another embodiment.

FIG. 3 is a drawing illustrating an integrated optical device according to a second embodiment. In an integrated optical device 1a, each of the first modulator 15, the second modulator 17, the third modulator 19, and the fourth modulator 21 also includes the Mach-Zehnder modulator illustrated in FIG. 2. If possible, in the description of the second embodiment, the same symbol will also be assigned to the same portion as in the first embodiment.

The integrated optical device 1a includes the first portion 4a and the second portion 4b, arrayed in the direction of the first axis Ax1. The first conductive portion 51, the second conductive portion 53, the third conductive portion 55, and the fourth conductive portion 57 are provided in the first portion 4a in the integrated optical device 1a. The array MARY including the first modulator 15, the second modulator 17, the third modulator 19, and the fourth modulator 21 is provided in the second portion 4b in the integrated optical device 1a. In more detail, the array MARY including the first modulator 15, the second modulator 17, the third modulator 19, and the fourth modulator 21 is provided in a first region 6a in the second portion 4b. The optical branching device (optical branching circuit) 41 is provided in a second region 6b in the second portion 4b. The first region 6a and the second region 6b in the second portion 4b are arrayed in the direction of the second axis Ax1.

According to this integrated optical device 1a, the first portion 4a and the second portion 4b are arrayed in order in the direction of the first axis Ax1. The conductive portions 51, 53, 55, and 57 connected to a termination device are provided in the first portion 4a. The modulator array MARY is provided in the first region 6a within the second portion 4b. The optical branching device 41 is provided in the second region 6b within the second portion 4b. In the first portion 4a between the modulator array MARY and the second edge portion 2b, the array PARY including the conductive portions 51, 53, 55, and 57 are disposed, and the branching (coupling) optical waveguide section 43 is also provided. Therefore, distances between each individual signal input 11 and the optical modulators 15, 17, 19, and 21 are substantially defined by the distance DIS between the array IARY including the first electric signal input section 25a to the fourth electric signal input section 25d and the modulator array MARY.

In addition, the optical branching device 41 and the modulator array MARY are disposed in the direction of the second axis Ax1 with avoiding an area between the modulator array MARY and the first edge portion 2a. Therefore, independently from the disposition of the optical branching device 41, it is possible to specify the distance DIS between the modulator array MARY and the array IARY located in the first edge portion 2a.

One end of the electrode 33 of the Mach-Zehnder modulator in the first modulator 15 is connected to the first electric signal input section 25a located in the first edge portion 2a of the integrated optical device 1a through the wiring conductor 61. One end of the electrode 35 of the Mach-Zehnder modulator in the second modulator 17 is connected to the second electric signal input section 25b located in the first edge portion 2a of the integrated optical device 1a through the wiring conductor 63. One end of the electrode 37 of the Mach-Zehnder modulator in the third modulator 19 is connected to the third electric signal input section 25c located in the first edge portion 2a of the integrated optical device 1a through the wiring conductor 65. One end of the electrode 39 of the Mach-Zehnder modulator in the fourth modulator 21 is connected to the fourth electric signal input section 25d located in the first edge portion 2a of the integrated optical device 1a through the wiring conductor 67. In the present embodiment, the wiring conductors 61, 63, 65, and 67 extend practically in a linear arrangement. In addition, the wiring conductors 61, 63, 65, and 67 preferably have a length of less than or equal to 1 mm. Practically no difference between the lengths of the wiring conductors 61, 63, 65, and 67 exists, and a difference therebetween may be made less than or equal to, for example, 0.1 mm.

It is desirable that the optical signal input section 23 is provided in the second edge portion 2b of the integrated optical device 1a. In this case, since the input port and the output port of light are located on a same edge portion, a formation process for antireflection coating provided on an input-output end surface is simplified. Therefore, it is possible to shorten a device manufacturing process. Furthermore, since the input port and the output port of light are located on a same edge portion, it is possible to easily establish connection with an external optical waveguide or an optical fiber. Alternatively, it is desirable that the optical signal input section 23 is provided in the third edge portion 2c of the integrated optical device 1a. In general, an optical waveguide within an integrated optical device has a higher optical loss than in a free space. Therefore, when the optical signal input section 23 is provided in the third edge portion 2c of the integrated optical device 1a, it is possible to make the length of an optical waveguide within the integrated optical device relatively short. Therefore, it is possible to reduce the loss of light. In addition, this disposition may be applicable to the first embodiment.

Third Embodiment

Figure 4:
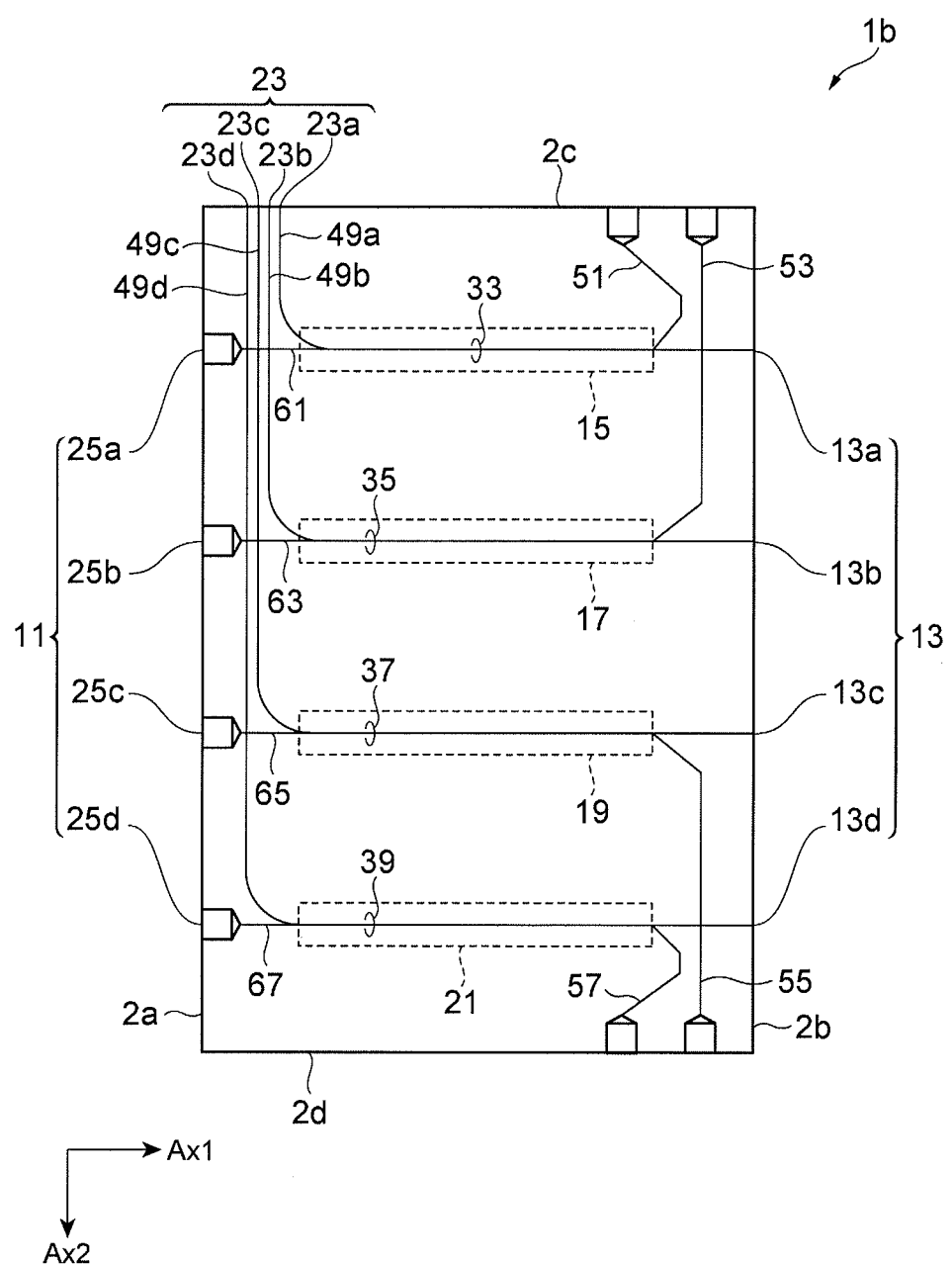
FIG. 4 is a drawing illustrating an integrated optical device according to another embodiment.

FIG. 4 is a drawing illustrating an integrated optical device according to a third embodiment. In an integrated optical device 1b, each of the first modulator 15, the second modulator 17, the third modulator 19, and the fourth modulator 21 includes an electro-absorption (EA) modulator. The electro-absorption modulator has an InGaAsP-based or InGaAlAs-based quantum well structure, for example. In addition, the electro-absorption modulator modulates light using a quantum confined Stark effect (QCSE), for example. If possible, in the description of the third embodiment, the same symbol will be assigned to the same portion as in the first embodiment or the second embodiment.

In the integrated optical device 1b, the optical signal input section 23 is provided in the third edge portion 2c. The optical signal output section 13 includes a first optical output port 13a, a second optical output port 13b, a third optical output port 13c, and a fourth optical output port 13d. The first optical output port 13a to the fourth optical output port 13d are arrayed along the second edge portion 2b. The first modulator 15, the second modulator 17, the third modulator 19, and the fourth modulator 21 are optically coupled to the first optical output port 13a, the second optical output port 13b, the third optical output port 13c, and the fourth optical output port 13d, respectively.

According to this integrated optical device 1b, the individual electro-absorption modulators 15, 17, 19, and 21 receive lights from individual optical input ports 23a to 23d within the optical signal input section 23 provided in the third edge portion 2c of the integrated optical device 1b, respectively. In addition, the individual electro-absorption modulators 15, 17, 19, and 21 are optically coupled to the optical output ports 13a to 13d arrayed along the second edge portion 2b, respectively. This disposition is suitable for the dispositions of the electro-absorption semiconductor modulators.

In the integrated optical device 1b, the first conductive portion 51 is connected to the first electrode portion 33 in the first modulator 15, and connects the first electrode portion 33 to a termination device. The second conductive portion 53 is connected to the second electrode portion 35 in the second modulator 17, and connects the second electrode portion 35 to a termination device. The third conductive portion 55 is connected to the third electrode portion 37 in the third modulator 19, and connects the third electrode portion 37 to a termination device. The fourth conductive portion 57 is connected to the fourth electrode portion 39 in the fourth modulator 21, and connects the fourth electrode portion 39 to a termination device. Conductive pads connected to the first conductive portion 51 and the second conductive portion 53 are disposed along the third edge portion 2c. On the other hand, conductive pads connected to the third conductive portion 55 and the fourth conductive portion 57 are disposed along the fourth edge portion 2d. The first modulator 15, the second modulator 17, the third modulator 19, and the fourth modulator 21 are optically coupled to the first optical input port 23a, the second optical input port 23b, the third optical input port 23c, and the fourth optical input port 23d, respectively. The first optical input port 23a, the second optical input port 23b, the third optical input port 23c, and the fourth optical input port 23d are arrayed along the third edge portion 2c or the fourth edge portion 2d. In the embodiment, the first optical input port 23a, the second optical input port 23b, the third optical input port 23c, and the fourth optical input port 23d are arrayed along the third edge portion 2c as shown in FIG. 4.

According to this integrated optical device 1b, the conductive pads connected to the first conductive portion 51 and the second conductive portion 53, used for connecting to a termination device, are arrayed along the third edge portion 2c. In addition, the conductive pads connected to the third conductive portion 55 and the fourth conductive portion 57, used for connecting to a termination device, are arrayed along the fourth edge portion 2d. The dispositions of these conductive portions and conductive pads do not interfere with the disposition of the input (11) of an electric signal and the disposition of the output (13) of an optical signal.

Fourth Embodiment

Figure 5:
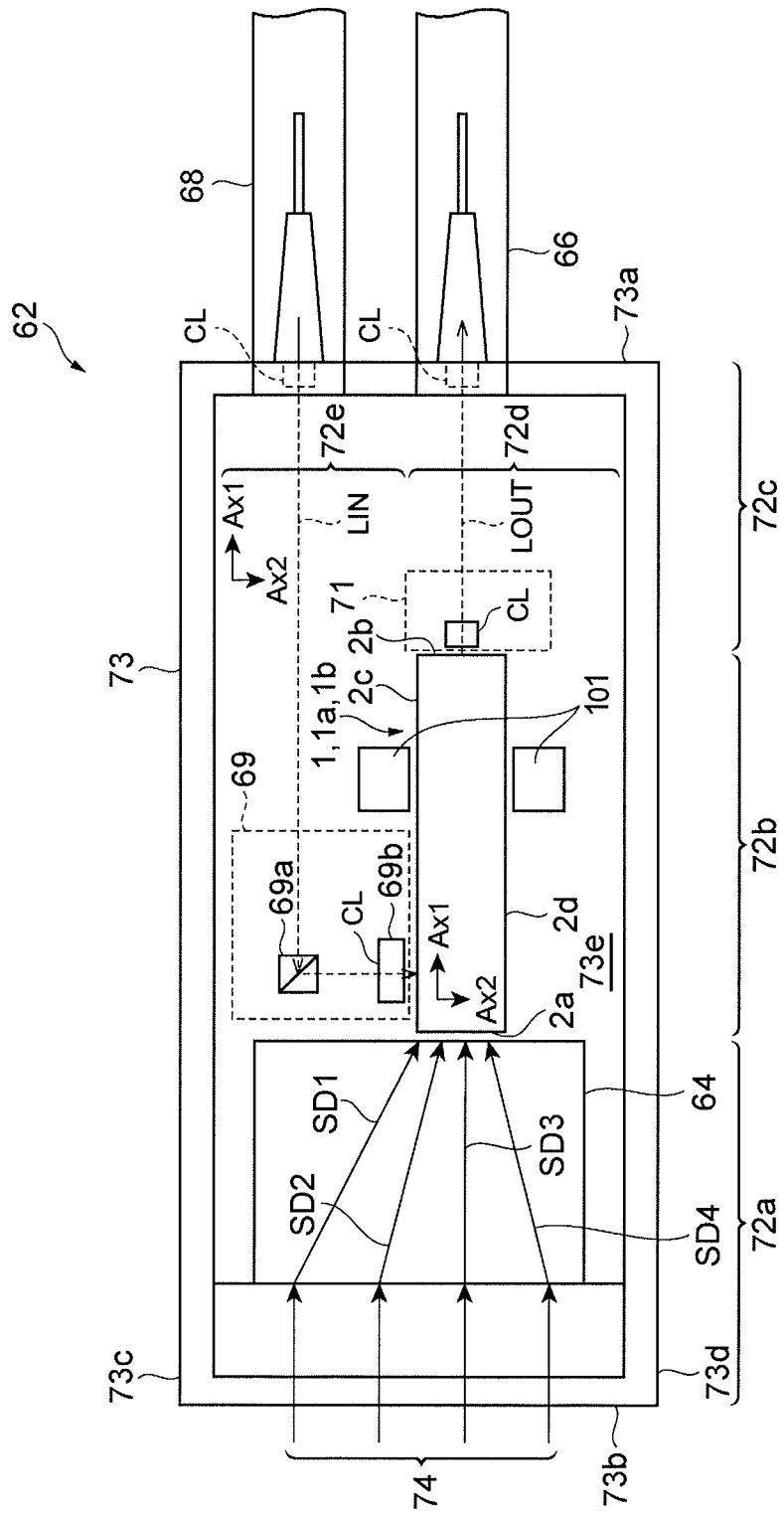
FIG. 5 is a drawing schematically illustrating an optical module according to the present embodiment.

FIG. 5 is a drawing schematically illustrating an optical module according to a fourth embodiment. An optical module 62 will be described with reference to FIG. 1, FIG. 3, and FIG. 4 along with FIG. 5. The optical module 62 includes one of the integrated optical devices 1, 1a, and 1b described above, the driving element 64, the output optical waveguide (for example, an optical fiber) 66, the input optical waveguide (for example, an optical fiber) 68, an optical circuit (an input optical circuit 69 and an output optical circuit 71), and a housing 73. The driving element 64 supplies a first driving signal SD1, a second driving signal SD2, a third driving signal SD3, and a fourth driving signal SD4 to the first electric signal input section 25a, the second electric signal input section 25b, the third electric signal input section 25c, and the fourth electric signal input section 25d in the integrated optical device (1, 1a, or 1b), respectively. The driving element 64 may include a device relaying a high-frequency signal or an integrated circuit used for driving a signal. The output optical waveguide 66 is optically coupled to the optical signal output section 13 in the integrated optical device (1, 1a, or 1b). The input optical waveguide 68 is optically coupled to the integrated optical device (1, 1a, or 1b), and supplies the input light LIN to the integrated optical device (1, 1a, or 1b). The housing 73 supports the integrated optical device (1, 1a, or 1b), the driving element 64, the output optical waveguide 66, the input optical waveguide 68, and the optical circuit (the input optical circuit 69 and the output optical circuit 71). The housing 73 includes a first sidewall 73a, a second sidewall 73b, a third sidewall 73c, and a fourth sidewall 73d. The first sidewall 73a and the second sidewall 73b extend in the direction of the second axis Ax2. The first sidewall 73a is located on the opposite side of the second sidewall 73b. The third sidewall 73c and the fourth sidewall 73d extend in the direction of the first axis Ax1. The third sidewall 73c is located on the opposite side of the fourth sidewall 73d.

The output optical waveguide 66 and the input optical waveguide 68 are connected to the first sidewall 73a. In addition, the first sidewall 73a supports the output optical waveguide 66 and the input optical waveguide 68. In the second sidewall 73b of the housing 73, an array of a plurality of conductive bodies (for example, lead terminals) 74 is provided. The plurality of conductive bodies 74 are connected to the driving element 64. The output optical waveguide 66 is optically coupled to the output optical circuit 71 through, for example, a collimator lens (CL). The input optical waveguide 68 is optically coupled to the input optical circuit 69 through, for example, a collimator lens (CL).

According to this optical module 62, the output optical waveguide 66 and the input optical waveguide 68 are connected to the first sidewall 73a of the housing 73. In addition, the first sidewall 73a of the housing 73 supports the output optical waveguide 66 and the input optical waveguide 68. Furthermore, in the second sidewall 73b of the housing 73, the array of the plural conductive bodies 74 that are connected to the driving element 64 is provided. Therefore, the dispositions of the input 23 for providing the optical signal LIN and the output (13) for providing the optical signal LOUT do not interfere with the disposition of the input (11) for providing the electric signals SD1, SD2, SD3, and SD4 to the integrated optical device (1, 1a, or 1b). In addition, the first driving signal SD1, the second driving signal SD2, the third driving signal SD3, and the fourth driving signal SD4 are supplied to the first electric signal input section 25a, the second electric signal input section 25b, the third electric signal input section 25c, and the fourth electric signal input section 25d in the above-mentioned integrated optical device (1, 1a, or 1b) through the driving element 64 receiving electric signals from the conductive bodies 74 in the second sidewall 73b. Therefore, in the flows of the electric signals from the array of the conductive bodies 74 in the second sidewall 73b of the housing 73 to the integrated optical device (1, 1a, or 1b), it is possible to reduce a skew between signals.

In the optical module 62, the output optical circuit 71 multiplexes, for example, lights from the optical signal output section 13 in the integrated optical device (1, 1a, or 1b), and provides a multiplexed light to the output optical waveguide 66. A half-wave plate, a polarization beam combiner, and so forth are used for optical multiplexing. The input optical circuit 69 provides light from the input optical waveguide 68, to the optical signal input section 23 in the integrated optical device (1, 1a, or 1b). The input optical circuit 69 includes, for example, a mirror 69a for changing the direction of propagation of light from the input optical waveguide 68 and providing the light to a collimator lens (CL) 69b.

The housing 73 has a supporting surface 73e. The supporting surface 73e includes a first area 72a, a second area 72b, and a third area 72c, arrayed in the direction of the first axis Ax1. The third area 72c includes a fourth area 72d and a fifth area 72e, arrayed in the direction of the second axis Ax2. The first area 72a of the supporting surface 73e mounts therein the driving element 64. The third area 72c of the supporting surface 73e mounts therein the output optical circuit 71. The fourth area 72d of the supporting surface 73e mounts therein the integrated optical device (1, 1a, or 1b). The fifth area 72e of the supporting surface 73e mounts therein the input optical circuit 69. According to this optical module 62, the integrated optical device (1, 1a, or 1b), the driving element 64, the input optical circuit 69, and the output optical circuit 71 are disposed with being associated with the disposition of the electric terminal 74, the disposition of the optical output port (13), and the disposition of the optical input port (11) in the integrated optical device (1, 1a, or 1b).

An optical module for the integrated optical device (1a) illustrated in FIG. 3 may further include an output optical circuit multiplexing lights from the optical signal output section in the integrated optical device and providing a multiplexed light to an output optical waveguide, and an input optical circuit providing a light from the input optical waveguide to an optical signal input section in the integrated optical device. The housing 73 includes the supporting surface 73e. The supporting surface 73e includes the first area 72a, the second area 72b, and the third area 72c that are arrayed in the direction of the axis Ax1. It is desirable that the first area 72a mounts therein the driving element 64, the second area 72b mounts therein the integrated optical device 1a, and the third area 72c mounts therein the output optical circuit and the input optical circuit.

Figure 6:
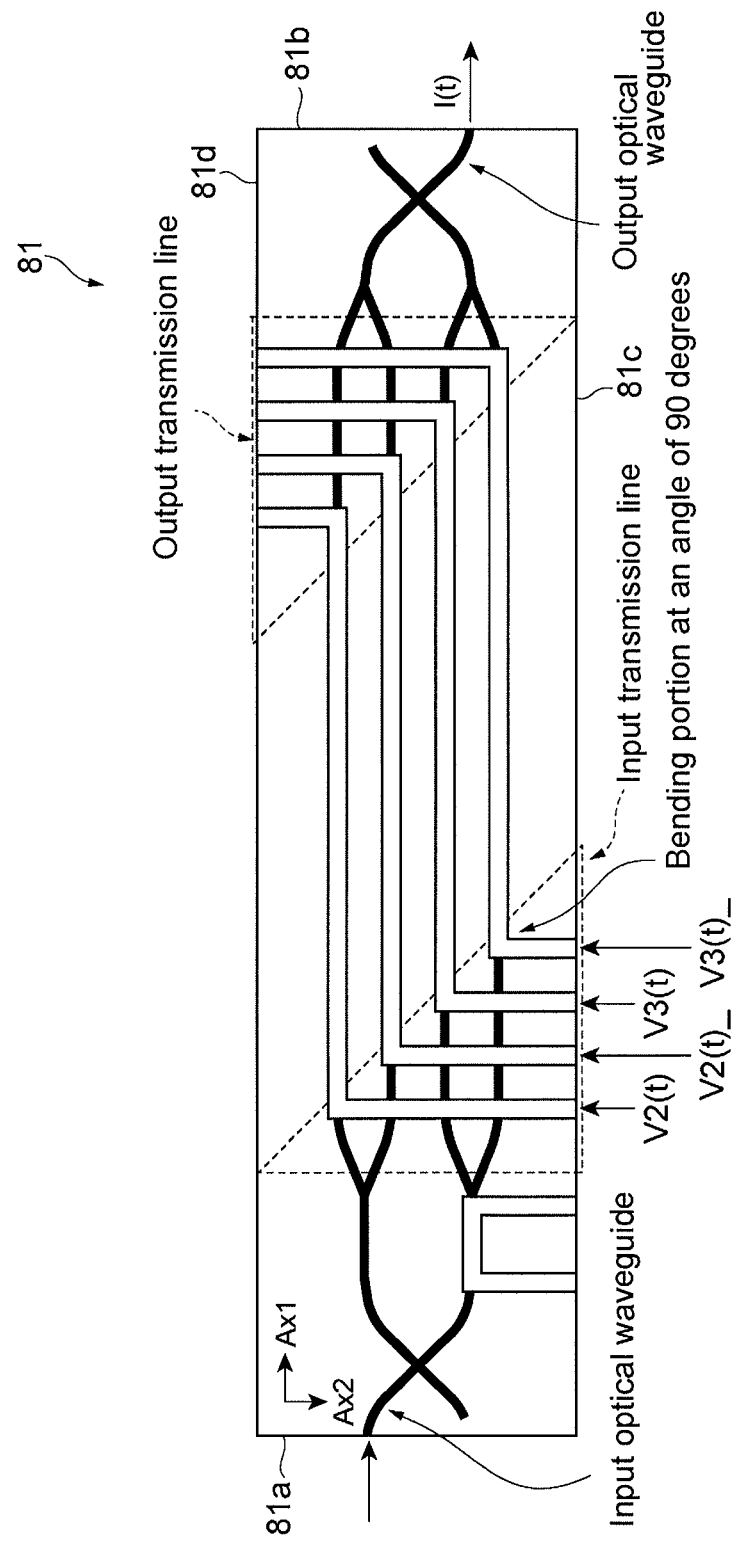
FIG. 6 is a drawing illustrating such an Integrated MZ modulator as illustrated in International Publication No. WO2008/117460.

FIG. 6 illustrates such an Integrated MZ modulator 81 as illustrated in International Publication No. WO2008/117460. This Integrated MZ modulator 81 includes a first edge portion 81a and a second edge portion 81b, which extend in the direction of the second axis Ax2, and a third edge portion 81c and a fourth edge portion 81d, which extend in the direction of the first axis Ax1. An optical input port is provided in the first edge portion 81a, and an optical output port is provided in the second edge portion 81b. In this Integrated MZ modulator, the Mach-Zehnder modulator includes a modulation waveguide in the direction of the first axis Ax1. These Mach-Zehnder modulators receive electric signals V2(t), V3(t), V2(t)_, and V3(t)_ from the third edge portion 81c extending in the direction of the first axis Ax1. These signals are supplied to the individual Mach-Zehnder modulators through input transmission lines. In addition, for the sake of termination, the individual Mach-Zehnder modulators reach the fourth edge portion 81d through output transmission lines connected to a termination device. The transmission line is bent at an angle of 90 degrees.

Figure 7:
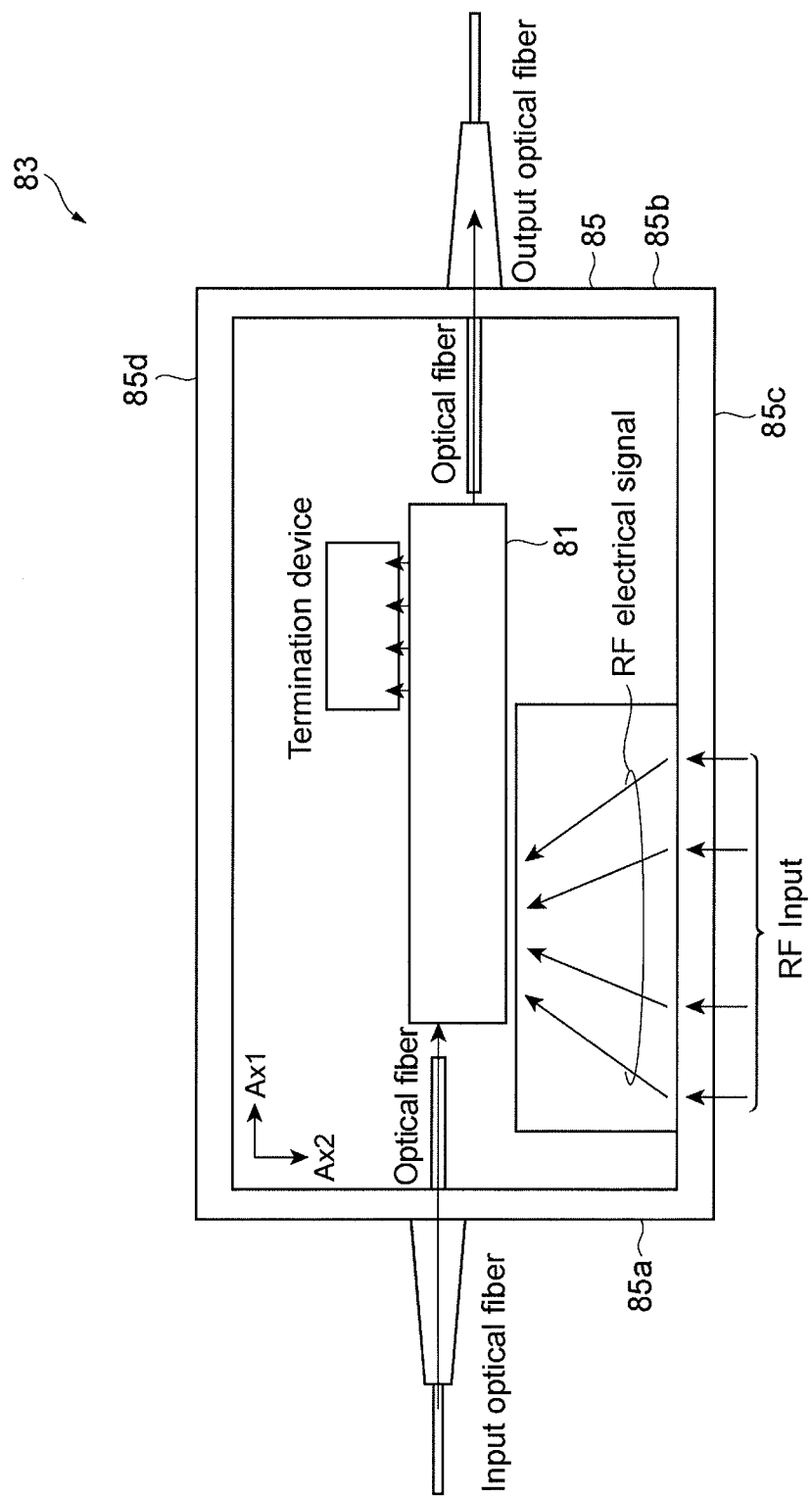
FIG. 7 is a drawing schematically illustrating an optical module housing such an Integrated MZ modulator as illustrated in International Publication No. WO2008/117460.

FIG. 7 is a drawing schematically illustrating an optical module 83 housing such an Integrated MZ modulator 81 as illustrated in International Publication No. WO2008/117460. A housing 85 included in the optical module 83 includes a first sidewall 85a, a second sidewall 85b, a third sidewall 85c, and a fourth sidewall 85d. The first sidewall 85a supports an input optical fiber, and the second sidewall 85*b* supports an output optical fiber. The third sidewall 85*c* includes an RF input terminal.

Figure 8:
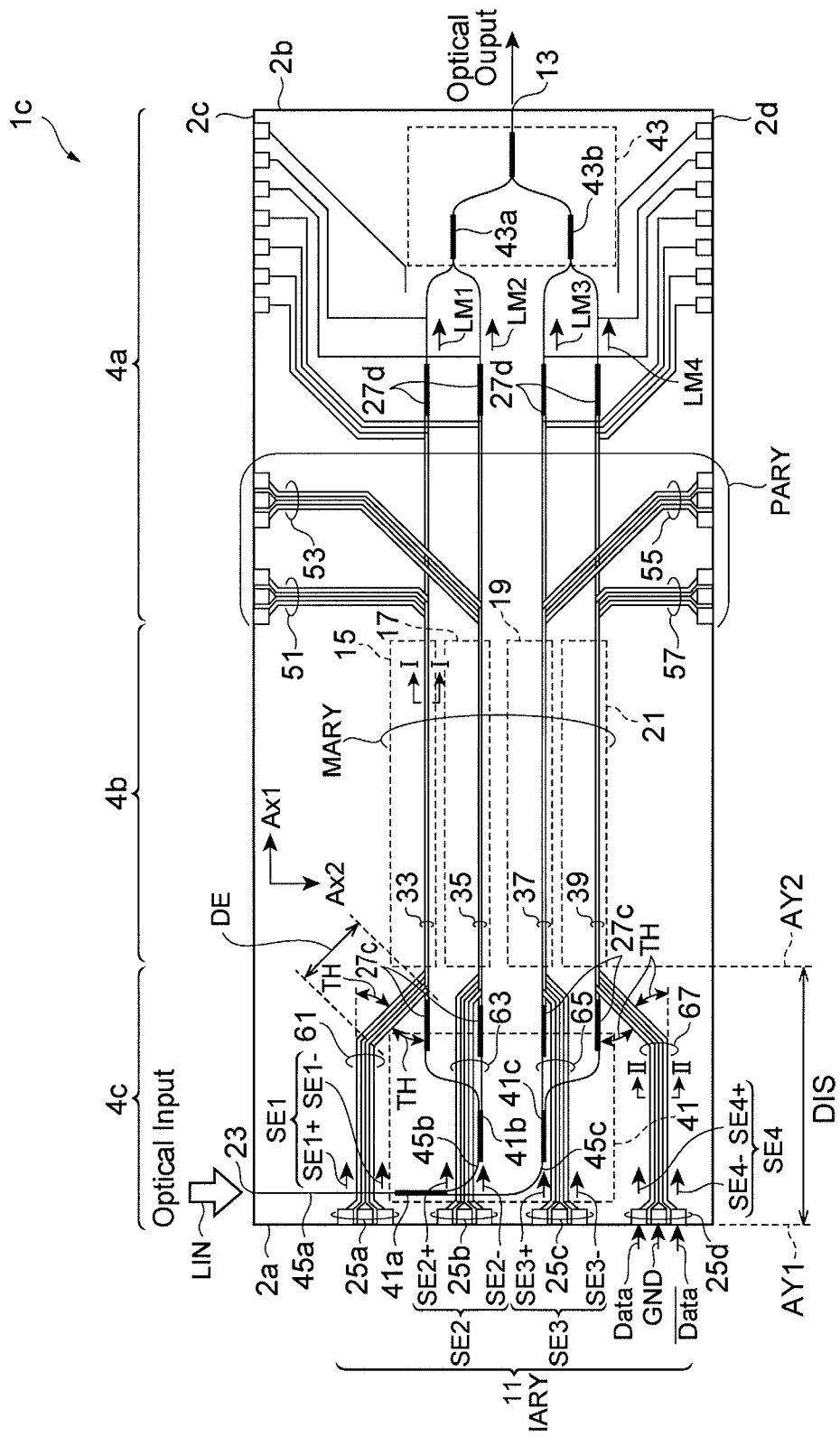
FIG. 8 is a drawing schematically illustrating an integrated optical device of an embodiment.
Figure 9:
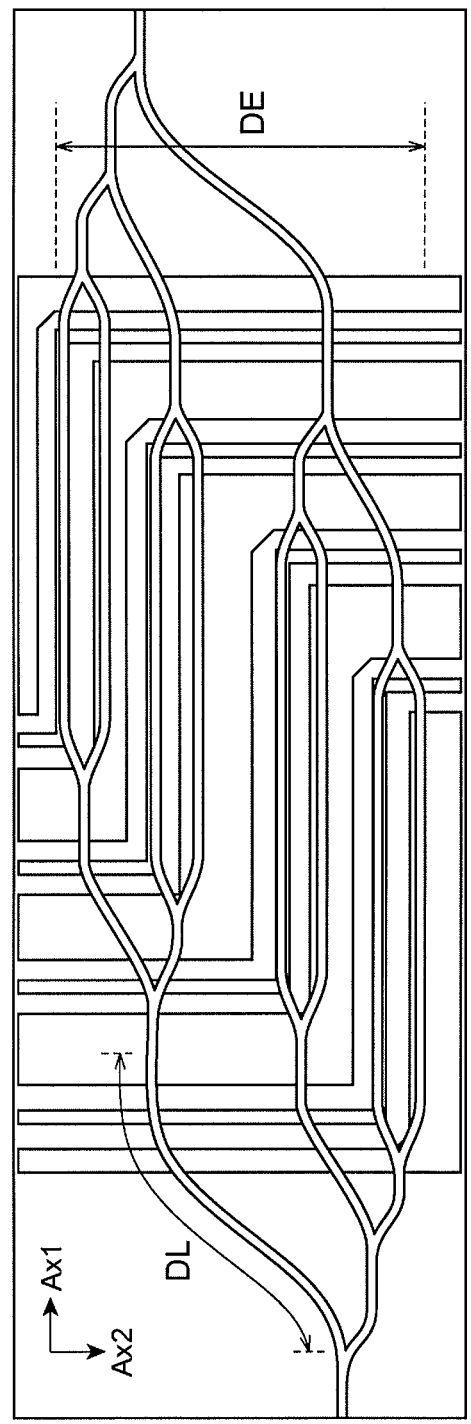
FIG. 9 is a drawing schematically illustrating such an integrated optical device as illustrated in Japanese Unexamined Patent Application Publication No. 2010-185978.

FIG. 8 is a drawing schematically illustrating an integrated optical device of an embodiment. FIG. 9 is a drawing schematically illustrating such an integrated optical device as illustrated in Japanese Unexamined Patent Application Publication No. 2010-185978. Referring to FIG. 9, a difference DE between the transmission paths of electric signals is illustrated. In the integrated optical device in FIG. 9, an optical modulator including an input transmission line whose length is the shortest and an optical modulator including an input transmission line whose length is the longest are formed. The difference DE between transmission lines inevitably occurs. In addition, so as to avoid overlapping of the input transmission line and the output transmission line, the positions of optical modulators are shifted in the direction of the first axis Ax1. This shift causes a difference DL between optical transmission lines. When a difference between electric transmission paths is 2 mm and the group velocity of an electric signal is $1.5 \times 10^8$ m/s, a skew between electric signals is estimated to be 13 ps. When a difference between optical transmission paths is 2 mm and the group velocity of an optical signal is $1.0 \times 10^8$ m/s, a skew between optical signals is estimated to be 20 ps. The sum of these is up to 33 ps.

Referring to FIG. 8, an integrated optical device 1*c* is illustrated whose structure is similar to the integrated optical device 1 illustrated in FIG. 1. In this integrated optical device, when a difference (DE) between electric transmission paths is 0.5 mm and the group velocity of an electric signal is $1.5 \times 10^8$ m/s, a skew between electric signals is estimated to be 3.3 ps. Since a difference between optical transmission paths is almost zero, a skew between optical signals is estimated to be 0 ps. The sum of these is 3.3 ps.

In addition, as illustrated in FIG. 4, in an integrated device (1*b*) in which a plurality of EA modulators (for example, four EA modulators) are integrated, the input waveguide of light faces in a direction perpendicular to a modulation waveguide. On the other hand, the transmission line of an electric signal on an input side extends parallel to the modulation waveguide. Between the input waveguide and the modulation waveguide, the optical waveguide is bent at an angle of 90 degrees. If the radius R of the bend of this optical waveguide is small (for example, R<800 µm), it is possible to shorten the transmission line of an electric signal.

In addition, in the EA modulator, so as to suppress an optical loss in an optical waveguide, it is desirable that a material whose light absorption is small is used for the core of a waveguide other than a modulating waveguide. For example, when light whose wavelength is 1.3 µm to 1.5 µm is modulated by the EA modulator, the core of a waveguide other than a modulating waveguide may include InGaAsP whose photoluminescence (PL) wavelength is 1.2 µm. A modulating waveguide and a transmitting waveguide (passive waveguide) are connected using a butt-joint method, for example.

When an optical waveguide in an integrated optical device including the EA modulator has a high-mesa structure, the optical waveguide having such a small bend radius R of less than 800 µm is realized. The optical waveguide having the high-mesa structure may be made of an InP-based semiconductor. This optical waveguide may include a semiconductor mesa that has a stacked structure including an InP lower cladding layer, a core layer (an AlGaInAs/InP multi-quantum well (MQW) structure), and an InP upper cladding layer. In addition, the side surface of a mesa including the core layer may also be embedded using a low-permittivity material such as dielectric material (for example, SiO2 or SiN), and resin (for example, polyimide resin or benzocyclobutene (BCB) resin). In addition, a mesa side surface may be air without being embedded.

In addition, the length of an electric transmission line on an output (termination) side may also be large. However, it is desirable that optical waveguides on an input side and the output side are short. At this time, the optical loss of an optical waveguide is reduced. Therefore, while an electric transmission line on the output side is bent at an angle of 90 degrees and extracted to a side edge portion of the integrated optical device, an optical waveguide used for outputting is linearly extended.

Figure 10A:
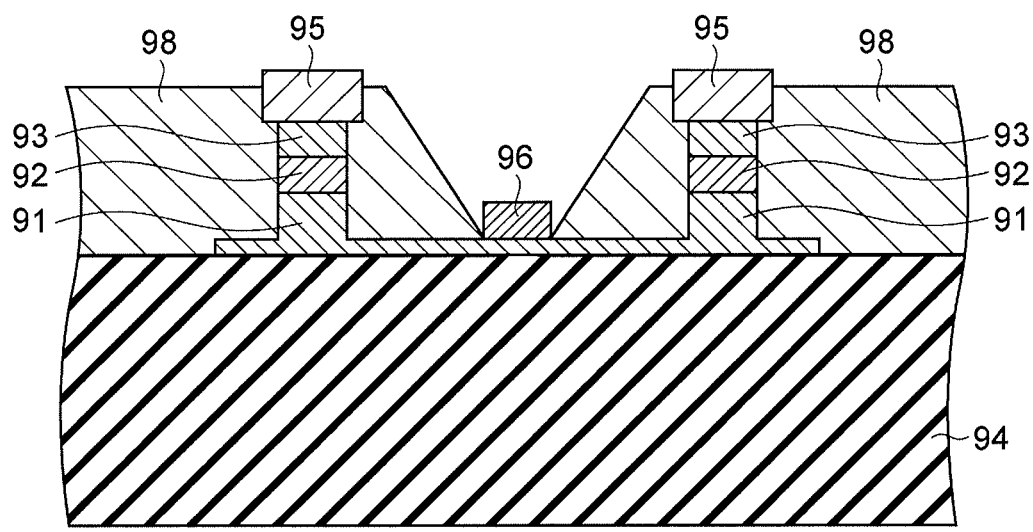
FIGS. 10A and 10B are drawings illustrating cross-sections of an integrated optical device of an embodiment.
Figure 10B:
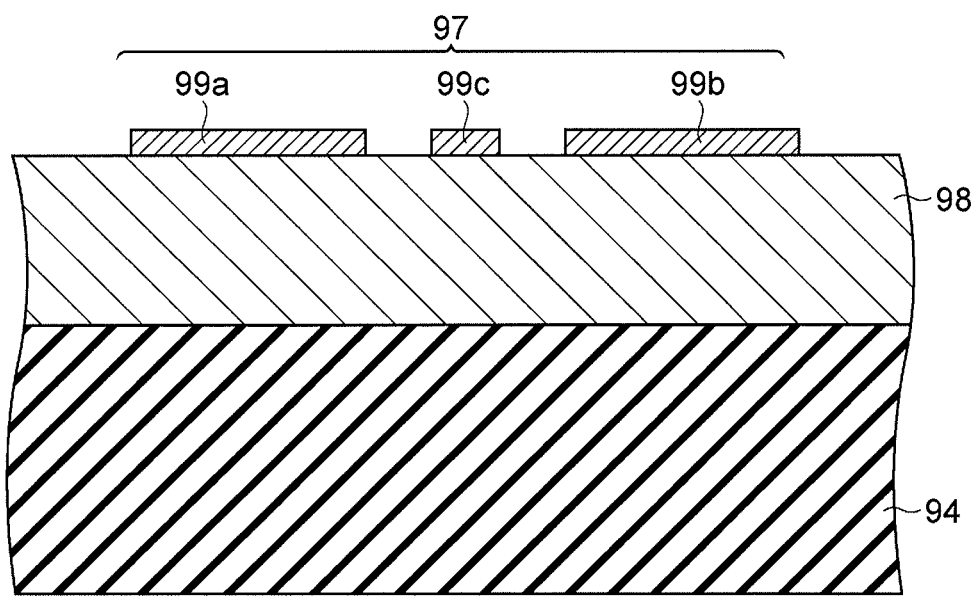

In addition, as described above, the integrated device in which the plural MZ modulators (for example, four MZ modulators) are integrated is used for multilevel modulation such as dual-polarization quadrature phase shift keying (DPQPSK)). The transmission line of this electric signal has the structure of a differential pair (a GND line in the center and conductive lines of the differential pair on both sides thereof). With respect to the optical input port, the optical waveguide on the input side changes the direction thereof with the angle of 90 degrees owing to a curved waveguide. Accordingly, it is possible to input light from an edge portion different from an edge portion in which the input of an electric signal is provided. Since the light absorption of the core of the MZ modulator is smaller than that of the EA modulator, the passive waveguide in the MZ modulator may have the same structure as the modulating waveguide. Accordingly, a joint portion such as butt-joint is not included in the integrated device in which the plural MZ modulators are integrated. FIG. 10A illustrates a cross-section taken along a line XA-XA illustrated in FIG. 1. In addition, FIG. 10B illustrates a cross-section taken along a line XB-XB illustrated in FIG. 1. As illustrated in FIG. 10A, the optical waveguide of the MZ modulator includes a stacked structure including a lower InP cladding layer 91, a semiconductor core layer 92, and an upper InP cladding layer 93. This stacked structure is provided on a semi-insulating InP substrate 94. The optical waveguide has a mesa structure. In addition, on the optical waveguide used for modulation, a modulating electrode 95 is provided in contact with a top surface of the mesa structure. In the embodiment, the modulating electrode 95 is formed on the upper cladding layer 93 in the mesa structure of the optical waveguide. Between two waveguide arms, a GND electrode 96 that is connected to the common lower InP cladding layer is provided. On the other hand, a group of conductor wiring lines 97 connected to the modulating electrode and the GND electrode in the modulator is provided on a resin layer (for example, a benzocyclobutene (BCB) resin layer) 98 embedding therein a semiconductor mesa, as illustrated in FIG. 10B. The group of conductor wiring lines includes a pair of signal wiring lines 99*a* and 99*b* propagating a modulating signal, and a GND wiring line 99*c*, and the GND wiring line extends between the pair of signal wiring lines.

In an integrated optical device including a plurality of optical modulators, a transmission line for an electric signal on an input side extends in the same direction as a modulating waveguide. When the array pitch of optical modulators in the integrated optical device is different from the array pitch of the input pads of electric signals, it is possible to compensate a difference between array pitches by bending a transmission line at an angle (within the angle range of the angle TH=−20 degrees to +20 degrees illustrated FIG. 1). So as to arrange a transmission line, a curved optical waveguide is connected to the optical waveguide on the input side. By using the curved optical waveguide, the direction of propagation of light from the optical waveguide on the input side is changed with the angle of about 90 degrees (70 degrees to 110 degrees). Using this structure, it is possible to shorten a transmission line used for an electric input and suppress a transmission loss. Owing to this loss suppression, it is possible to reduce a driving voltage amplitude and operate at a higher frequency. In addition, since the input transmission line has slight bend and is approximately straight, a skew is small.

In an embodiment of an optical module where an integrated optical device including the array of electro-absorption (EA) optical modulators or Mach-Zehnder (MZ) type optical modulators is mounted in a carrier, the loss of an electric signal increases compared with an optical module in which a single optical modulator is mounted. Owing to this loss increase, characteristic degradation such as an increase in a driving voltage amplitude or a decrease in an operating frequency band occurs. In an integrated optical device including a plurality of optical modulators, owing to the integration of modulators, a transmission line that links an electric signal input section and an optical modulator to each other becomes long, compared with the optical module in which the single optical modulator is mounted. In the optical module in which the single optical modulator is mounted, a single wiring line supplying a driving signal to the single optical modulator is provided. In an integrated optical device including a plurality of optical modulators, input transmission lines have different transmission paths of electric signals are formed. Specifically, an optical modulator including an input transmission line whose length is the shortest and an optical modulator including an input transmission line whose length is the longest are formed (see FIG. 9). Therefore, the transmission loss of an integrated optical device increases.

In a semiconductor device including a Mach-Zehnder modulator driven by a differential signal, a transmission delay time difference (skew) between a pair of signals occurs. The skew is one of causes leading to the deterioration of an optical output signal. A transmission line connecting a wiring pad for inputting an electric signal to an optical modulator is bent in such a manner that the lengths of two transmission lines used for a differential pair become different from each other. For example, the transmission line connecting the wiring pad for inputting the electric signal to the optical modulator is bent in such a manner that a transmission line in an outer side portion becomes long. This difference in the lengths of the transmission lines becomes a cause of a skew.

According to the present embodiment, an integrated optical device includes such a disposition that signal transmission path lengths leading to integrated optical modulators are made uniform between the optical modulators.

An integrated optical device and an optical module according to the present invention are not limited to those described in the above embodiment and various modifications can be made. For example, in the above embodiment, the integrated optical device 1 includes the four modulators of the first modulator 15, the second modulator 17, the third modulator 19, and the fourth modulator 21. However, the integrated optical device may include a plurality of modulators. Accordingly, the integrated optical device may include a plurality of electric signal input sections arrayed along the first edge portion extending in a direction of a second axis. The integrated optical device may include a plurality of conductive portions used for connecting a termination device. For example, each of the conductive portions are connected to one of the electrode portions of the modulators.

In the embodiment, the optical signal output section 13 includes the first optical output port 13a to the fourth optical output port 13d. The optical signal input section 23 includes the first optical input port 23a to the fourth optical input port 23d. Alternatively, the optical signal output section may include a plurality of optical output ports which are optically coupled to the modulators. The optical signal input section may include a plurality of optical input ports which are optically coupled to the modulators.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. An integrated optical device comprising:
    a first edge portion extending along a second axis that intersects with a first axis, a second edge portion located opposite the first edge portion and extending along the second axis, a third edge portion, and a fourth edge portion located opposite the third edge portion;
    a first portion, a second portion, and a third portion arrayed in order along the first axis in a direction from the second edge portion toward the first edge portion;
    a plurality of modulators each of which includes an optical waveguide and an electrode portion provided on the optical waveguide, each optical waveguide extending along the first axis;
    a plurality of electric signal input sections arrayed along the first edge portion, each of the electric signal input sections being connected to a corresponding one of the electrode portions of the modulators;
    an optical signal input section providing input light to the modulators;
    an optical signal output section provided in the second edge portion, the optical signal output section being optically coupled to the modulators,
    a plurality of conductive portions for connecting a termination device, each of the conductive portions being connected to a corresponding one of the electrode portions of the modulators; and
    an optical branching device to branch light to the modulators, the optical branching device optically coupling the optical signal input section to the modulators, wherein
    the plurality of conductive portions is provided in the first portion,
    the plurality of modulators is provided in the second portion,
    the optical branching device is provided in the third portion,
    the modulators are arrayed along the second axis, and
    the optical signal input section is provided in one of the second edge portion, the third edge portion, and the fourth edge portion.

2. The integrated optical device according to claim 1, further comprising:
    a waveguide type optical branching section provided between the second edge portion and the modulators, wherein
    the optical signal output section is optically coupled to the modulators through the waveguide type optical branching section, and
    each of the modulators includes a Mach-Zehnder modulator.

3. The integrated optical device according to claim 1, wherein the optical signal input section is provided in the third edge portion, the third edge portion extending along the first axis.

4. The integrated optical device according to claim 1, wherein the optical signal input section is provided in the second edge portion.

5. The integrated optical device according to claim 1, wherein
the plurality of modulators includes a first modulator, a second modulator, a third modulator, and a fourth modulator,
the plurality of electric signal input sections includes a first electric signal input section, a second electric signal input section, a third electric signal input section, and a fourth electric signal input section that are connected to the first modulator, the second modulator, the third modulator, and the fourth modulator, respectively,
the first modulator, the second modulator, the third modulator, and the fourth modulator are arrayed in order along the second axis,
the first electric signal input section, the second electric signal input section, the third electric signal input section, and the fourth electric signal input section are arrayed along the first edge portion, and
the optical signal input section is provided in the third edge portion, the third edge portion extending along the first axis.

6. The integrated optical device according to claim 1, wherein
the optical signal output section includes a plurality of optical output ports which are arrayed along the second edge portion,
the optical signal input section is provided in the third edge portion, the optical signal input section including a plurality of optical input ports which are arrayed along the third edge portion, and
each of the modulators includes an electro-absorption modulator and is optically coupled to one of the optical input ports and one of the optical output ports.

7. The integrated optical device according to claim 6, wherein the conductive portions are arrayed along the third edge portion or the fourth edge portion.

8. An optical module comprising:
an integrated optical device including:
a first edge portion extending along a second axis that intersects with a first axis, a second edge portion located opposite the first edge portion and extending along the second axis, a third edge portion, and a fourth edge portion located opposite the third edge portion;
a plurality of modulators each of which includes an optical waveguide and an electrode portion provided on the optical waveguide, each optical waveguide extending along the first axis;
a plurality of electric signal input sections arrayed along the first edge portion, each of the electric signal input sections being connected to a corresponding one of the electrode portions of the modulators;
an optical signal input section providing input light to the modulators; and
an optical signal output section provided in the second edge portion, the optical signal output section being optically coupled to the modulators, wherein the modulators are arrayed along the second axis, and the optical signal input section is provided in one of the second edge portion, the third edge portion, and the fourth edge portion;
a plurality of conductive bodies;
a driving element supplying a driving signal from the plurality of conductive bodies to the electric signal input section in the integrated optical device;
an input optical waveguide optically coupled to the optical signal input section in the integrated optical device;
an output optical waveguide optically coupled to the optical signal output section in the integrated optical device; and
a housing supporting the integrated optical device, the driving element, the input optical waveguide, and the output optical waveguide, wherein
the housing includes a first sidewall and a second sidewall located opposite the first sidewall, the first sidewall and the second sidewall extending along the second axis,
the input optical waveguide and the output optical waveguide are connected to the first sidewall of the housing, and
the plurality of conductive bodies connected to the driving element are provided in the second sidewall of the housing.

9. The optical module according to claim 8, further comprising:
a first optical circuit multiplexing light from the optical signal output section in the integrated optical device and providing multiplexed light to the output optical waveguide; and
a second optical circuit providing light from the input optical waveguide to the optical signal input section in the integrated optical device, wherein
the housing includes a supporting surface including a first area, a second area, and a third area that are arrayed along the first axis,
the second area includes a fourth area and a fifth area, arrayed along the second axis,
the first area of the supporting surface mounts therein the driving element,
the third area of the supporting surface mounts therein the first optical circuit,
the fourth area of the supporting surface mounts therein the integrated optical device, and
the fifth area of the supporting surface mounts therein the second optical circuit.

10. The optical module according to claim 8, further comprising:
a first optical circuit multiplexing light from the optical signal output section in the integrated optical device and providing multiplexed light to the output optical waveguide; and
a second optical circuit providing light from the input optical waveguide to the optical signal input section in the integrated optical device, wherein
the housing includes a supporting surface including a first area, a second area, and a third area that are arrayed along the first axis,
the first area of the supporting surface mounts therein the driving element,
the second area of the supporting surface mounts therein the integrated optical device, and
the third area of the supporting surface mounts therein the first optical circuit and the second optical circuit.

11. An integrated optical device comprising;
a first edge portion extending along a second axis that intersects with a first axis, a second edge portion located opposite the first edge portion and extending along the second axis, a third edge portion, and a fourth edge portion located opposite the third edge portion;
a first portion and a second portion that are arrayed along the first axis, the second portion including a first region and a second region that are arrayed along the second axis, a plurality of modulators, each modulator including an optical waveguide and an electrode portion provided on the optical waveguide, each optical waveguide extending along the first axis;

a plurality of electric signal input sections arrayed along the first edge portion, each of the electric signal input sections being connected to a corresponding one of the electrode portions of the modulators;

an optical signal input section providing input light to the modulators;

an optical signal output section provided in the second edge portion, the optical signal output section being optically coupled to the modulators;

a plurality of conductive portions for connecting a termination device, each of the conductive portions being connected to a corresponding one of the electrode portions of the modulators; and an optical branching device to branch light to the modulators, the optical branching device optically coupling the optical signal input section to the modulators, wherein the conductive portions are provided in the first portion, the modulators are provided in the first region in the second portion, the optical branching device is provided in the second region in the second portion, the modulators are arrayed along the second axis, and the optical signal input section is provided in one of the second edge portion, the third edge portion, and the fourth edge portion.

12. An integrated optical device comprising:

a first edge portion extending along a second axis that intersects with a first axis, a second edge portion located opposite the first edge portion and extending along the second axis, a third edge portion, and a fourth edge portion located opposite the third edge portion;

a first modulator, a second modulator, a third modulator, and a fourth modulator, each modulator including an optical waveguide and an electrode portion provided on the optical waveguide, each optical waveguide extending along the first axis;

a first electric signal input section, a second electric signal input section, a third electric signal input section, and a fourth electric signal input section respectively connected to the first modulator, the second modulator, the third modulator, and the fourth modulator;

an optical signal input section providing input light to the modulators; and an optical signal output section provided in the second edge portion along the second axis, the optical signal output section being optically coupled to the modulators, wherein the first modulator, the second modulator, the third modulator, and the fourth modulator are arrayed in order along the second axis, the first electric signal input section, the second electric signal input section, the third electric signal input section, and the fourth electric signal input section are arrayed along the first edge portion, and the optical signal input section is provided in the third edge portion.

13. An integrated optical device comprising:

a first edge portion extending along a second axis that intersects with a first axis, a second edge portion located opposite the first edge portion and extending along the second axis, a third edge portion, and a fourth edge portion located opposite the third edge portion;

a plurality of modulators, each modulator including an optical waveguide and an electrode portion provided on the optical waveguide, each optical waveguide extending along the first axis;

a plurality of electric signal input sections arrayed along the first edge portion, each of the electric signal input sections being connected to a corresponding one of the electrode portions of the modulators;

an optical signal input section providing input light to the modulators; and an optical signal output section provided in the second edge portion, the optical signal output section being optically coupled to the modulators, wherein the modulators are arrayed along the second axis, the optical signal output section includes a plurality of optical output ports that are arrayed along the second edge portion, the optical signal input section is provided in the third edge portion, the optical signal input section including a plurality of optical ports that are arrayed along the third edge portion, and each of the modulators includes an electro-absorption modulator and is optically coupled to one of the optical input ports and one of the optical output ports.

14. The integrated optical device according to claim 13, further comprising:

a plurality of conductive portions for connecting a termination device, each of the conductive portions being connected to a corresponding one of the electrode portions of the modulators, wherein the conductive portions are arrayed along the third edge portion of the fourth edge portion.

* * * * *